Jan. 6, 1942. H. A. FARRAND 2,269,363
COLLAPSIBLE STRUCTURE
Filed March 16, 1939 11 Sheets-Sheet 3

Inventor:
Hiram A. Farrand
by his Attorneys
Howson & Howson

Jan. 6, 1942.   H. A. FARRAND   2,269,363
COLLAPSIBLE STRUCTURE
Filed March 16, 1939   11 Sheets-Sheet 4
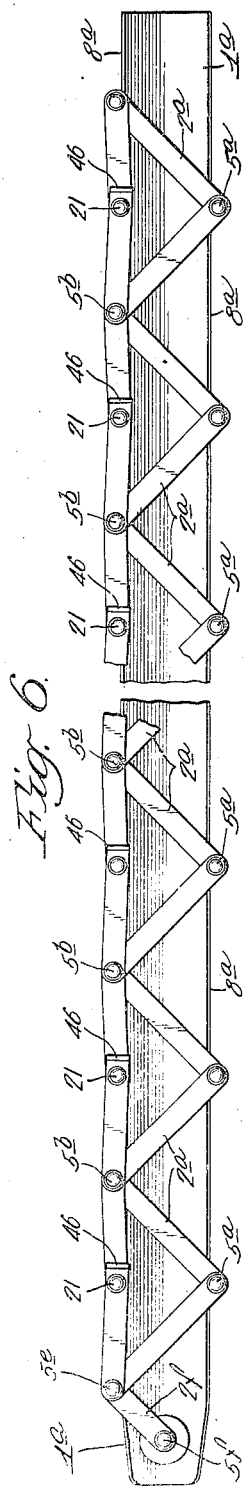
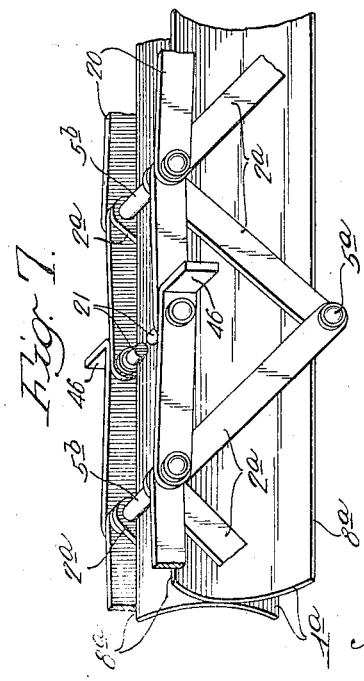
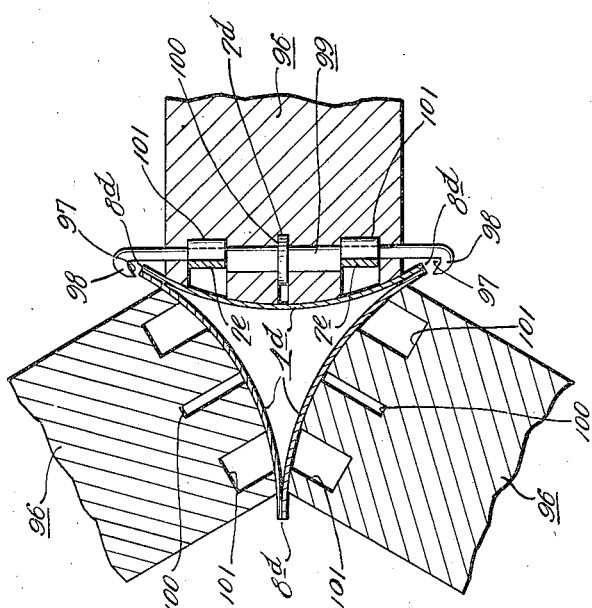
Inventor:
Hiram A. Farrand
by his Attorneys
Howson & Howson Jan. 6, 1942.　　　H. A. FARRAND　　　2,269,363
COLLAPSIBLE STRUCTURE
Filed March 16, 1939　　　11 Sheets-Sheet 5
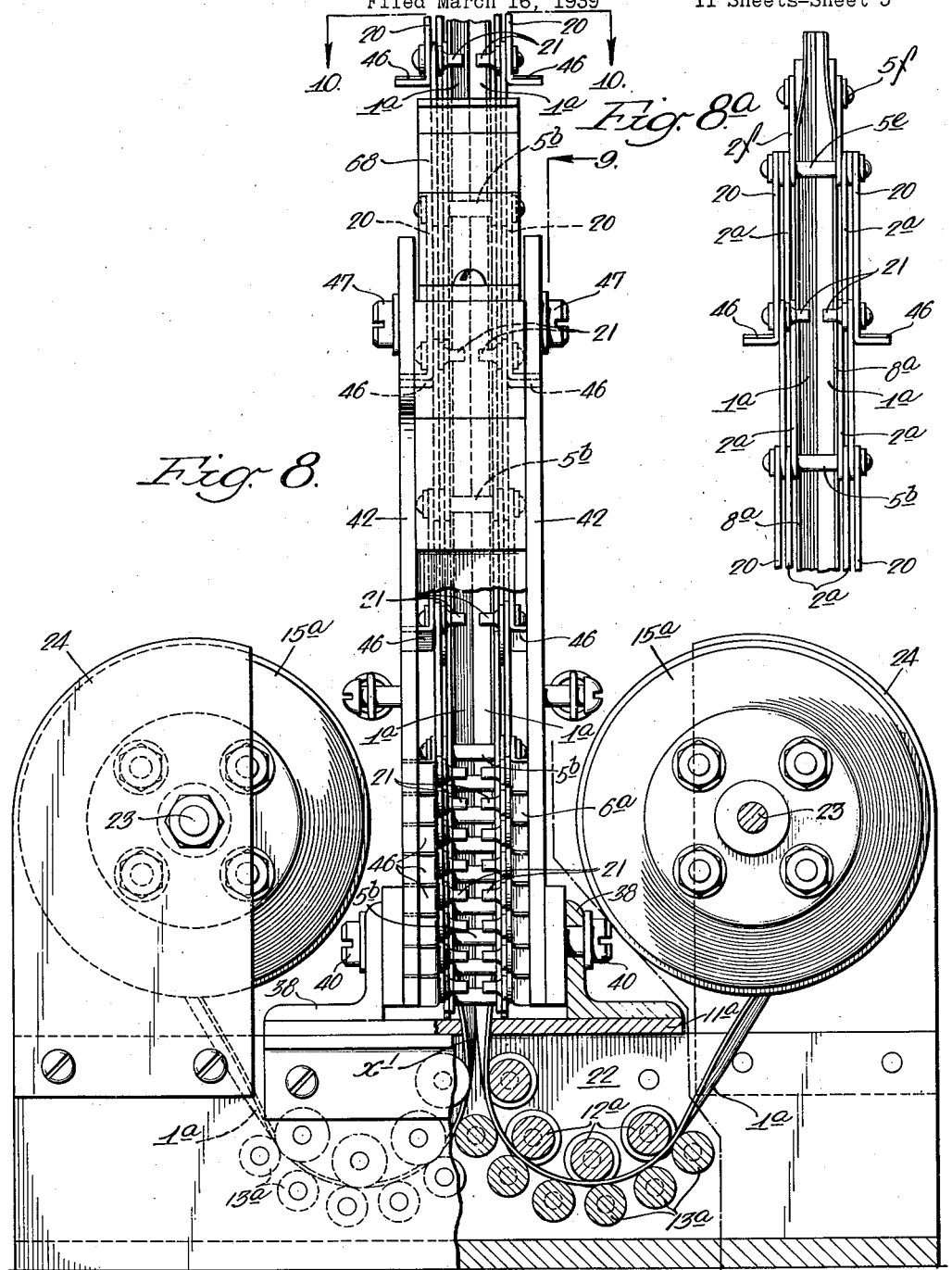

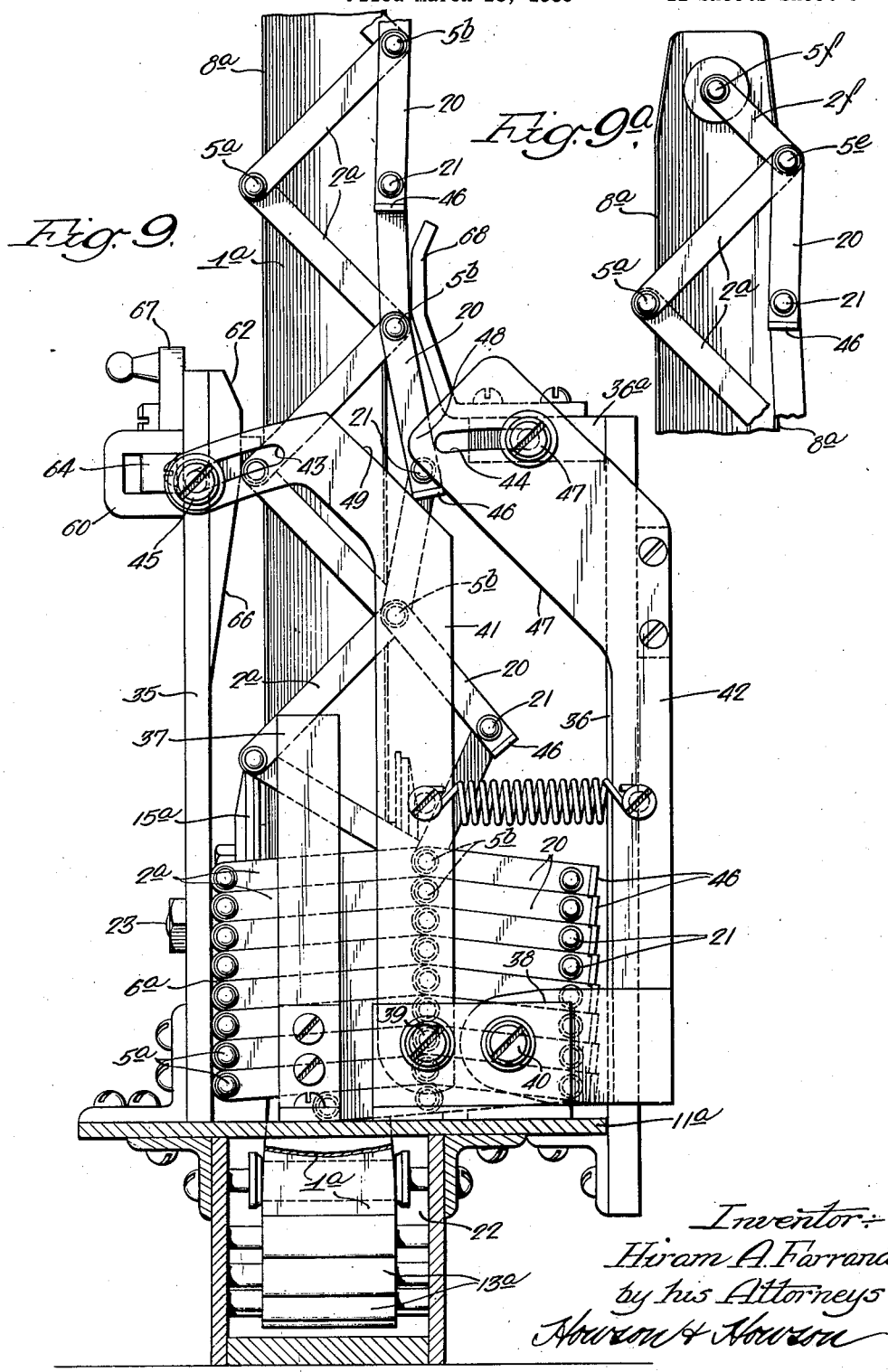

Jan. 6, 1942. H. A. FARRAND 2,269,363
COLLAPSIBLE STRUCTURE
Filed March 16, 1939 11 Sheets-Sheet 7

Inventor:
Hiram A. Farrand
by his Attorneys
Howson & Howson

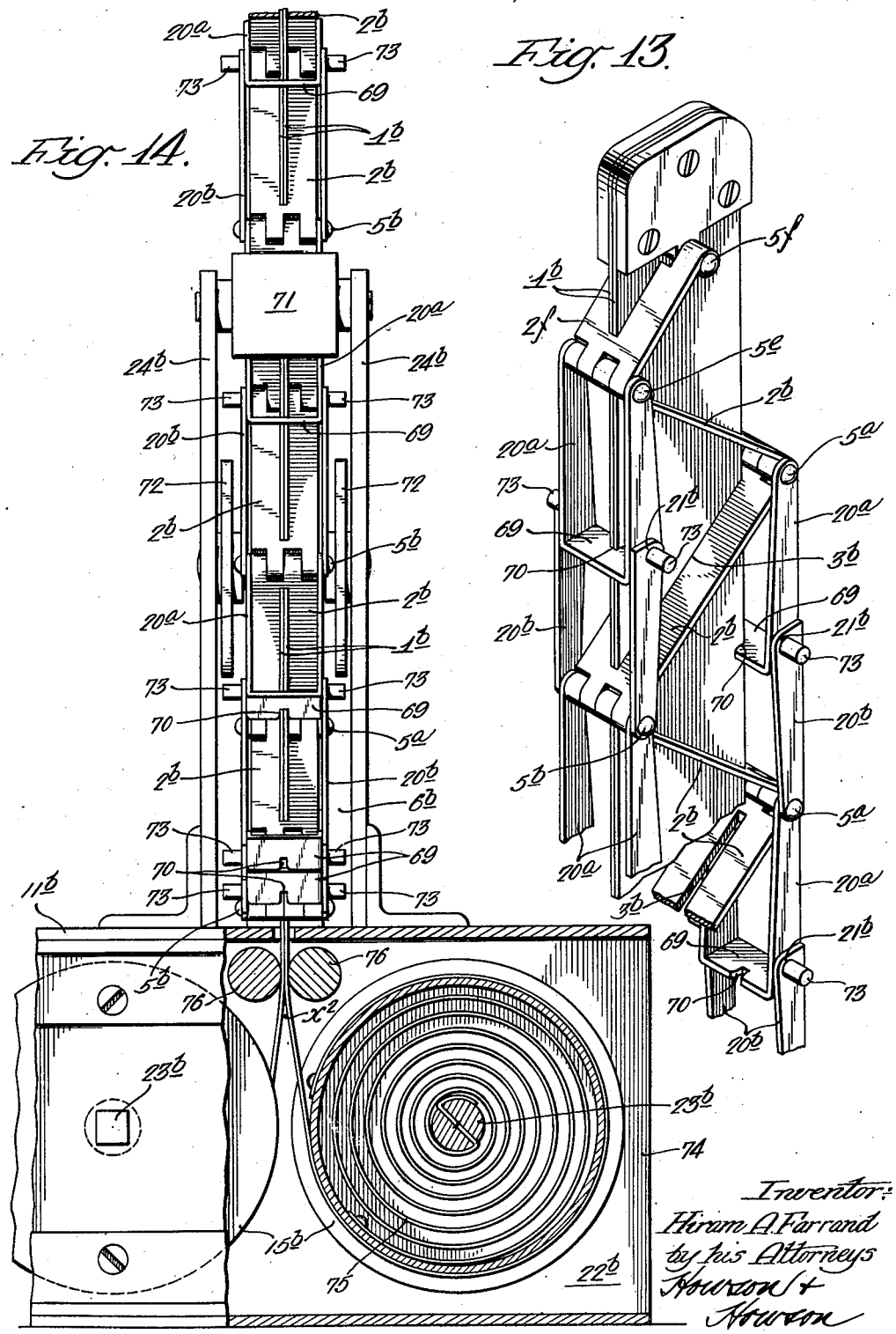

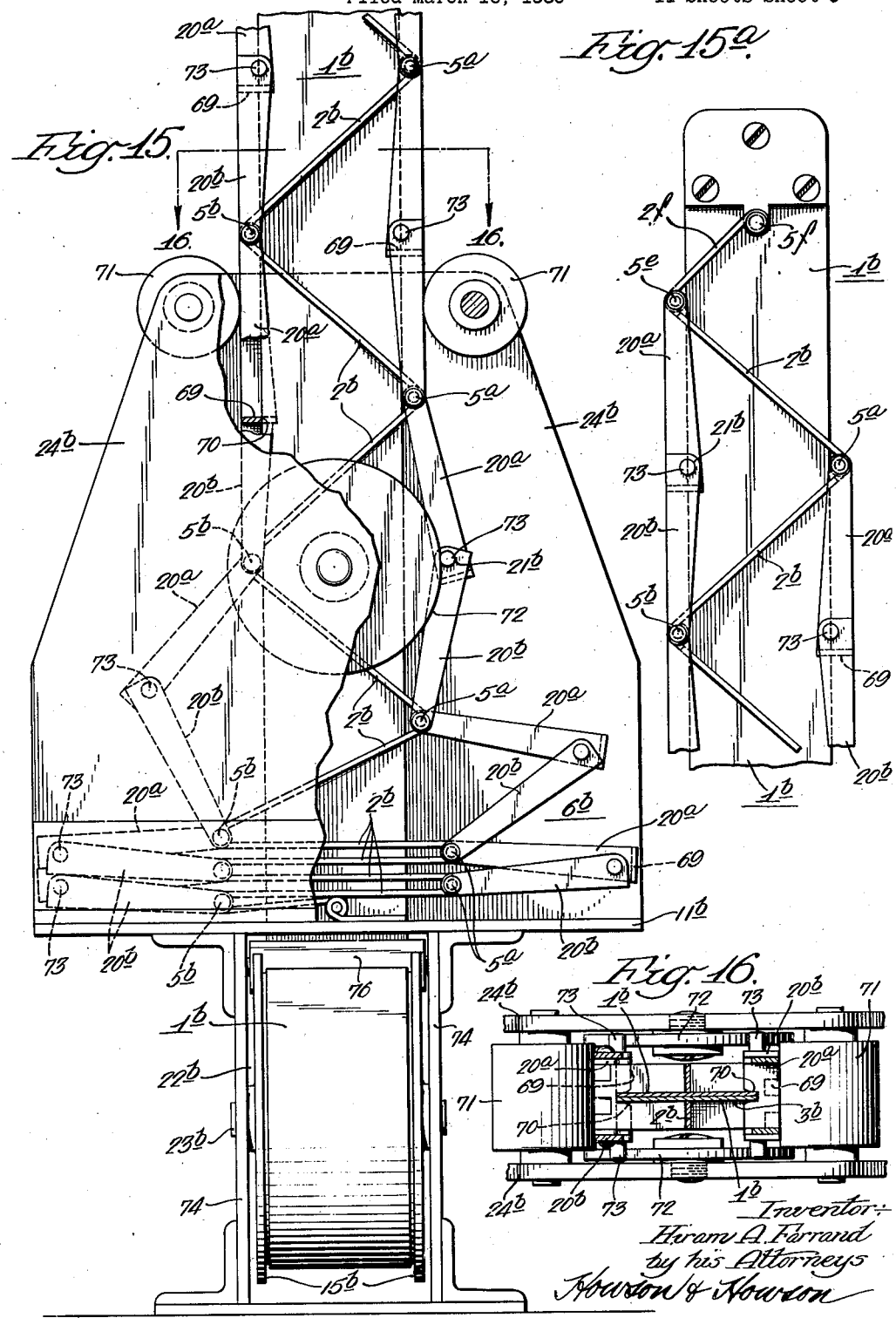

Jan. 6, 1942.    H. A. FARRAND    2,269,363
COLLAPSIBLE STRUCTURE
Filed March 16, 1939    11 Sheets-Sheet 10
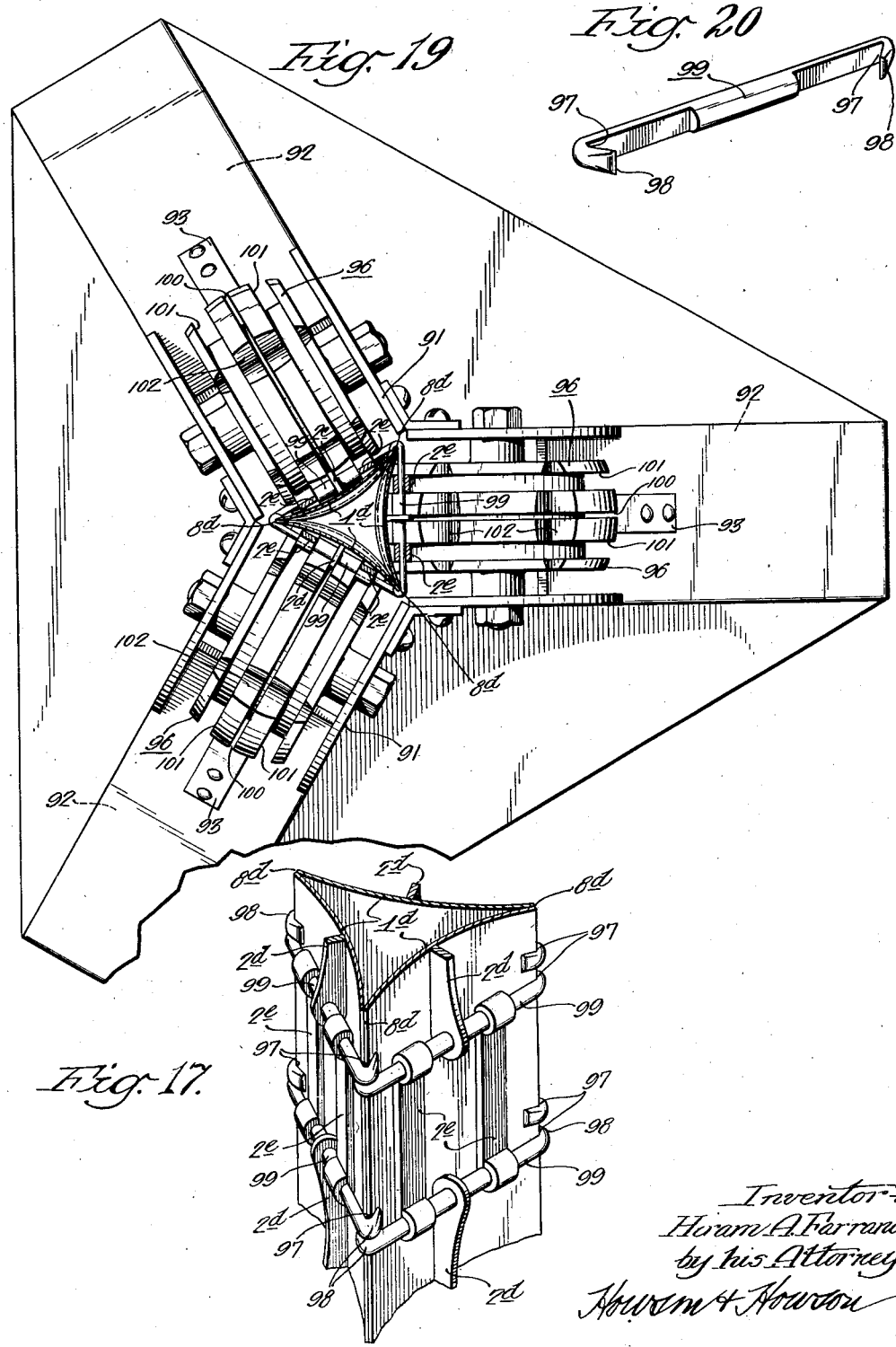

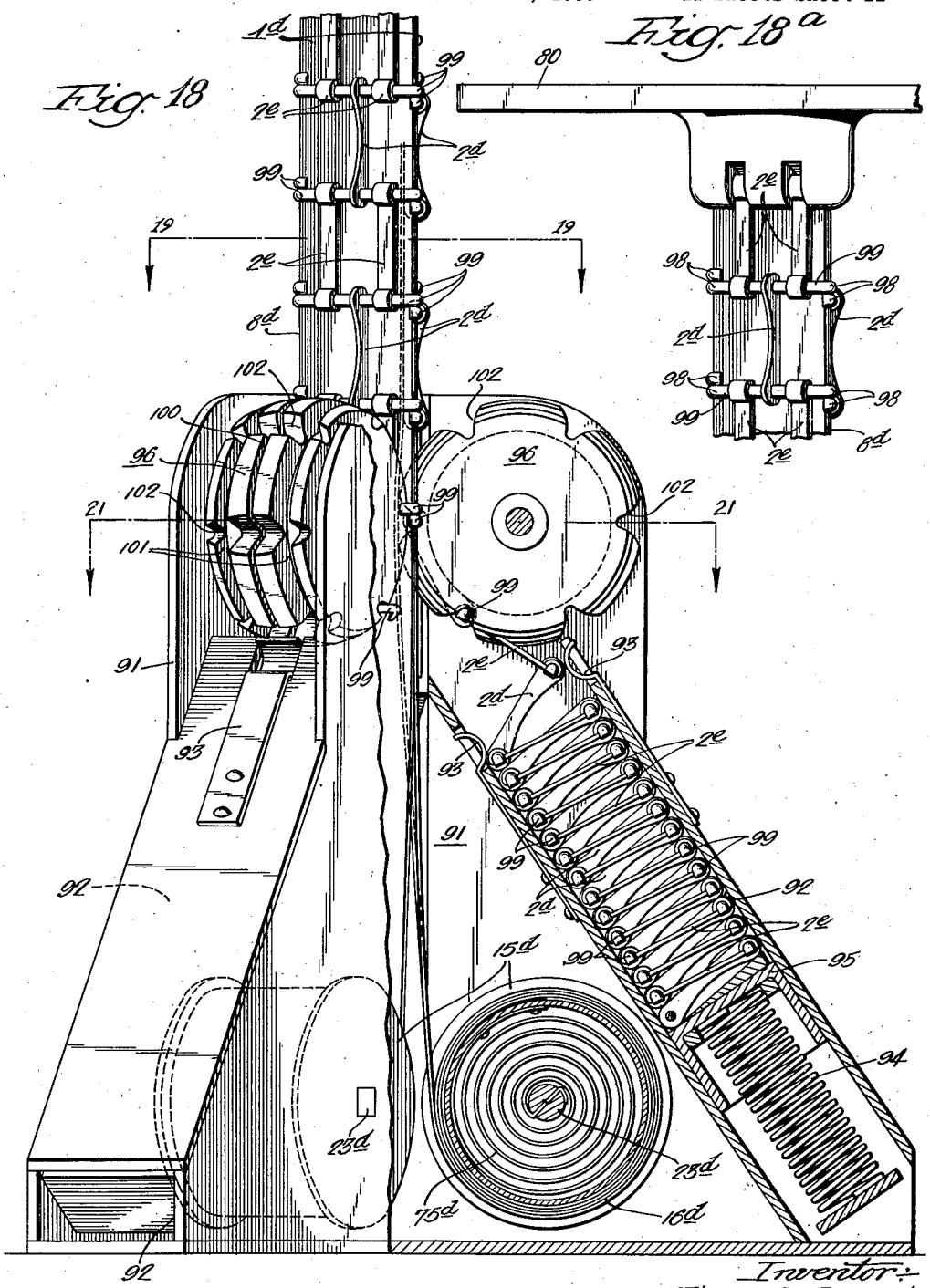

Patented Jan. 6, 1942

2,269,363

UNITED STATES PATENT OFFICE 2,269,363

COLLAPSIBLE STRUCTURE

Hiram A. Farrand, Berlin, N. H.

Application March 16, 1939, Serial No. 262,324

34 Claims. (Cl. 189—37)

This invention relates to collapsible devices, i. e. devices which are convertible from one form to another in such manner as to be reduced to and confined in compact shape, for storage or transportation purposes, yet capable of projection outwardly, in whole or in part, from such compact shape into a substantially straight and rigid formation, which may attain a comparatively extended longitudinal dimension, to function as a column, beam, strut, cantilever or other structural support, and which as such may be applicable to a wide variety of uses. Furthermore, the present invention relates to that class of adjustable devices which are compounded from normally separable, non-rigid members, which, by reason of suitable connective means, may be united to form a comparatively long, rigid, structure, which latter may be dismembered to free the assembled component members in such manner as to permit of their being disposed of in a relatively restricted state.

Devices of this character have been known to the prior art, wherein the component members consisted of flexible strips of resilient material interlocked at their edges, or otherwise engaged by laterally extending elements placed at intervals along the longitudinal extension of the structure. It has been the practice in some prior art devices to dispose of such portions of the component members as are not being used and, when such unused portions are in the released or disconnected state, by winding all such parts together, simultaneously, into a common coil. Even in the very simplest of such arrangements difficulties are encountered in operation, since the circumferential distance around the coil can never be the same for any two convolutions. Consequently, the rate of take-up or delivery of the different strips proceeds at unequal rates at the reel, or coil, while the rate of movement of these same strips while connected together in the compound structure is the same for all. Obviously, a surplus or deficiency will accumulate in one or more of the components between the coil and the point of assembly.

In other prior art devices employing the edge interlocking type of component members, separate places of storage are provided for each member; and, in addition to the means by which the locking and unlocking of the edges of the components are accomplished, the devices are provided with special means for placing discrete bands around the assembled component members at relatively spaced points along the length of the structure as the component members thereof are assembled, and for removing the encircling bands during disassembling of the component members.

The encircling bands of the prior art devices, being separate and not connected in any way one with another engage the structure frictionally and are subject to relative displacement along the structure, requiring, in instances where a rigid relationship between the bands and the composite structure is essential, the manual placing and removal of locking pins in and out of aligned openings in the bands and the encircled structure.

One of the objects of the present invention in addition to providing separate and individual accommodations for the separated portion of the components, including independent storage and regulating facilities for each member, and the provision of means for embracing the assembled components of the extended portion of the structure, is to provide means for interconnecting the embracing elements. The facilities thus employed are made to react in response to demand, by taking up or delivering equivalent portions of all components including the chain of interconnected bracing elements during any change being made in the length of the compound structure. This procedure has particular advantages where two or more groups of component members have widely differing physical characteristics.

The employment of the laterally extending interlocking elements in the form of teeth and holes, hooks or other undesirable projections constituting permanently affixed engaging means located along the length of the flexible strip members as have been used in the prior art structures above noted, have been eliminated by the present invention. According to the present invention a smooth uninterrupted surface and edge is preserved throughout the effective length of all strip members and wholly independent and separable means is relied upon to bind the different components into a structural whole. By reason of this provision the binding elements, when not serving as part of the united structure, may slip along over the smooth surfaces of the strips without hindrance in the process of moving to and from storage. In the absence of permanently affixed connective elements a system is introduced whereby all components, though separable and free when disconnected, automatically resume their respective positions and duties when drawn back into renewed association at the point of assembly with the other components of the united structure.

Furthermore, by this method of segregating the various components according to characteristics and duties of each, the resultant structure may be made to assume the form of a reinforced beam or column, wherein the continuous strip members enact the role of a longitudinal web and the binding elements constitute a system of lateral bracing,—the latter being distributed, automatically, over the length of the web and at definite and correct intervals thereon at the time of their assembly. It is also possible by this method to generate fractional parts of the total available length of unit structure, and in such manner that each fractional part retains its integrity regardless of changes occurring elsewhere. That is, the length of the unitary structure may be altered at any other locality by adding or subtracting other portions without disturbing the stability of the part under consideration.

It is to be observed that in the devices of the present invention the component members, alone, though entirely independent when separated, react cooperatively during the time of assembly to present themselves in proper order and equivalent proportion to create the desired length of unit body, and that no feeding mechanism, extraneous thereto, is required. Furthermore, no readjustment of relations is called for subsequent to their entry into union.

Other objects of my invention will be in part obvious, and in part pointed out more in detail hereinafter, reference being had to the accompanying drawings, of which:

Fig. 4 is a transverse sectional elevation taken on the line 4—4, Fig. 2;

Fig. 6 is a side elevation of a second form of composite structure made and assembled in accordance with the present invention;

Fig. 7 is a fragmentary perspective view illustrating a portion of the structure shown in Fig. 6;

Figure 10:
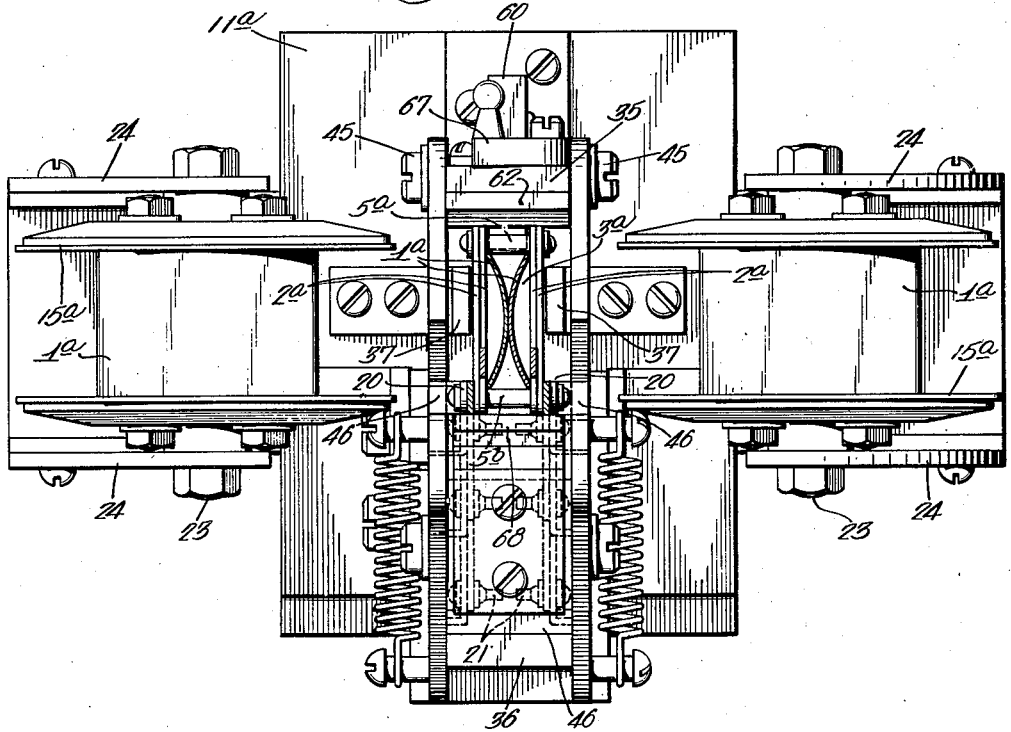
Figure 11:
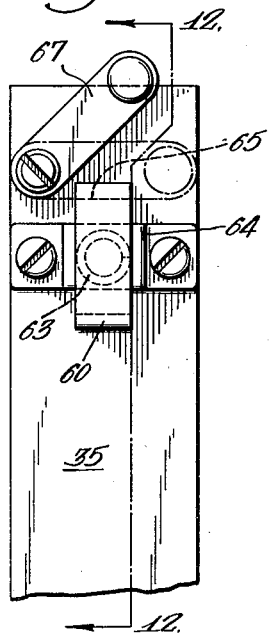
Figure 12:
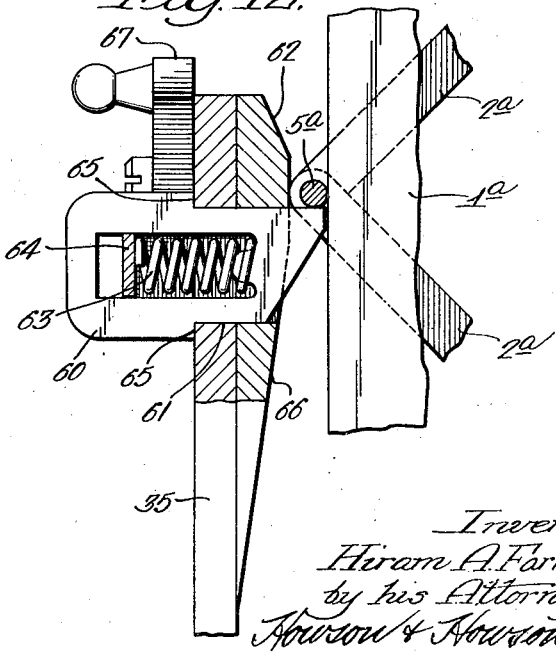

Figs. 8 and 8a constitute a side elevation of a device for assembling and disassembling the structure of Fig. 6 and showing said structure partially extended;

Figs. 9 and 9a constitute a transverse sectional elevation taken on the line 9—9, Fig. 8;

Fig. 10 is a sectional plan view taken on the line 10—10, Fig. 8;

Fig. 11 is a front view of a detail of the mechanism shown in Fig. 9;

Fig. 12 is a sectional elevation taken on the line 12—12, Fig. 11;

Fig. 13 is a perspective view of a third form of structure made and assembled in accordance with the present invention;

Fig. 14 is a side elevation partly in section of an assembling and disassembling device for the structure of Fig. 13;

Figs. 15 and 15a constitute a transverse elevation of the collapsing device and composite structure shown in Fig. 14;

Fig. 16 is a sectional plan taken on the line 16—16, Fig. 15;

Fig. 17 is a fragmentary perspective view of a fourth form of composite structure made and assembled in accordance with the principles of the present invention;

Figs. 18 and 18a constitute a side elevation, partly in section, of a device for assembling and disassembling the component parts of the composite structure shown in Fig. 17;

Fig. 19 is a sectional plan view taken on the line 19—19, Fig. 18;

Fig. 20 is a perspective view of one of the component parts of the structure of Fig. 17;

Fig. 21 is a sectional plan view taken on the line 21—21, Fig. 18.

The devices shown in Figs. 1, 2, 3, 4, 6, 7, 8, 8a, 9, 9a, 10, 13, 14, 15, 15a, 16, 17, 18, 18a, 19 and 21 are composite structures formed by the union of two or more members, or elements. These elements taken by themselves are unable to withstand the amount of strain for which the entire composite structure is calculated; nor will their separate and individual resistances together add up to the total strength of the composite structure which they combine to form. Furthermore, when separated from one another each member may be withdrawn from the assembly which constitutes the composite structure in such a way that it may be converted into a form different from that which it assumed in the assemblage, with its longitudinal dimension materially reduced in such manner as to occupy very much less space than in extension and thus lend itself to compact formation when out of use and thus permit of its being converted into convenient shape for transportation and storage.

The cooperative effect, therefore, is to produce a relatively strong and rigid structure inherently resistant to tensile, compressive, and torsional stresses about the longitudinal axis of the structure when the elements are in combination with each other and the extraneous elements which maintain the combination, and to lend to portability when displaced therefrom.

In the structure in Figs. 1 to 5 inclusive, two of the component members 1, 1 are normally rectilinear flexible strips of spring material, and as such are capable of being bent out of line with reference to their normal longitudinal shape. The strips 1, 1, shown in Figs. 1 to 4 inclusive are normally of a straight longitudinal extension and of a bent, or nonplanar, transverse shape, sometimes referred to as concavo-convex. Each is in the form of a shallow trough. Being composed of a relatively thin section of spring material the elasticity or flexibility thereof permits them to be forced out of their normal longitudinal and transverse shape by bending or coiling. It is further pointed out that wherever such bend or coil takes place, the relative shapes are reversed, with the longitudinal extension becoming bent and the transverse curvature is converted into a straight form. By passing from their rectilinear state in a direction different therefrom the strips are able to cooperate in altering the original state of extension of the composite body. It is to be noted also that whenever the members or elements 1, 1 are bent out of their original shape the strips have an inherent tendency to return to the original nonplanar state in which they are normally rectilinear in the longitudinal direction.

In Figs. 1, 2, 3, 4 and 5 the remaining member of the composite structure is a system of pivotally connected links 2, 2, each link of which is provided with an elongated hole 3 through which the pair of strips 1, 1, pass. As will be seen by reference to Figs. 1 and 4, each link is made up of a rigid plate and the entire system of links are hinged one to another, at their oppositely disposed adjacent ends as indicated at 5, 5. In this way the links 2, 2 may be folded or drawn out in accordion fashion. When joined with the strips 1, 1, to produce the composite structure, the links 2, 2, take a zigzag course along the strips. When withdrawn from their combination they may rest in folded shape within a storage space as shown at 6 in Fig. 4. While the links 2, 2 are in this latter condition the strips 1, 1, lie only in loose contact within the openings 3 and are free to pass therethrough in either direction.

It is to be remarked that the strips 1, 1, in Figs. 1, 2, 3 and 4 are located in parallel position with their concave surfaces facing and only touching at their extreme edges, thus forming a rod of substantially elliptical tubular cross section. It may also be noted that this tubular rod is surrounded by the links, 2, 2. The openings 3 in the links 2 are such that when the links 2, 2 are stretched in zigzag formation along the tube with the extreme points 7, 7 of said openings engaging the edges 8, 8 of the tube, the interior edge contour of the opening snugly fits the external cross sectional contour of the tube where it comes in contact therewith.

Whenever the link system is in this stretched position and a strain occurs along the composite structure, the tensile and compressive forces operate through the diagonals which, in turn, convey them in reciprocal relation to the walls of the tubing, thus forming, in effect, a triangular truss, or "Warren girder."

In Fig. 4 the several members 1, 1, and 2, 2, of which the structure is composed are shown in two extreme conditions. The upper portion exhibits the composite structure in condition to withstand duty strains, as above described, while the lower portion illustrates the parts dissociated and in loose contact. The diagonally extending links 2, 2, are seen folded and at rest in their storage space, while the strips 1, 1, forming the tubular portion are free to slip easily through the series of openings 3, 3 in the links which lie substantially at right angles to the longitudinal axis of the tube. As a matter of fact, the tubular formation 10 moves through the openings and passes on down beyond the base plate 11, of the storage chamber 6 to a point $x$ where the strips 1, 1, bend laterally into separate opposite transverse paths and follow the peripheries of guide rolls or pulleys 12, 12 guided by freely rotatable guide roller 13, 13 for a distance, and then move upward to points of engagement or attachment 14, 14 on the winding drums of reels 15, 15, where they form into individual coils 16, 16, (see Fig. 2).

Inasmuch as all the essential parts entering into the composition of the structure may be withdrawn therefrom and stored in a comparatively small space, and, because of the fact that varying quantities of such components may thus be withdrawn in proportion, it is possible to reduce, or increase, the length of the structure at will, and to whatever extent the supply of parts provides for.

Figs. 6, 7, 8, 8a, 9, 9a, and 10 show a slightly different arrangement from that exhibited in Figs. 1, 2, 3, 4, and 5. In this style of structure, while the strips 1a, 1a, are the same as the strips 1, 1 in the previous case, it will be observed that they are placed back to back, rather than face to face, i. e. with their convex sides facing and touching only along their middle lines. The diagonal bracing links 2a, 2a, are formed of lengths of flat side-bars, linked together somewhat in the form of a sprocket chain. When the chain bars 2a, 2a, and the strips 1a, 1a, are in structural combination, the strips pass through rectangular openings 3a, 3a formed by the side bars 2a, 2a, and hinge-pins 5a, 5a, 5b, 5b, and thus are surrounded by the chain or link system which lies in a zigzag course in contact with the four strip edges 8a, 8a. The dimensions of the openings 3a are so related to the shape of the strips that the four edges of the latter contact the chain at the junctures of the side bars 2a, 2a, with the hinge pins 5a, 5a, 5b, 5b, and when forced to the limit of the extended zigzag course, the chain holds the strips in a tight embrace, with the longitudinal middle portions of the strips 1a, 1a, pressed tightly one against the other. It will be noted that the hinge pins 5a and 5b form rigid elements which engage the longitudinal edges of the strips 1a, 1a and that these hinge pins are connected for free pivotal, relative movement by the links 2a, 2a diagonally crossing from edge to edge of said strips. In this form of my invention, the "element" referred to in certain of the appended claims comprises a pair of links 2a, 2a and hinge pins 5a, 5b connecting said pairs of links, these "elements" being connected for free, pivotal, relative movement by alternate pairs of the links 2a, 2a.

Figure 1:
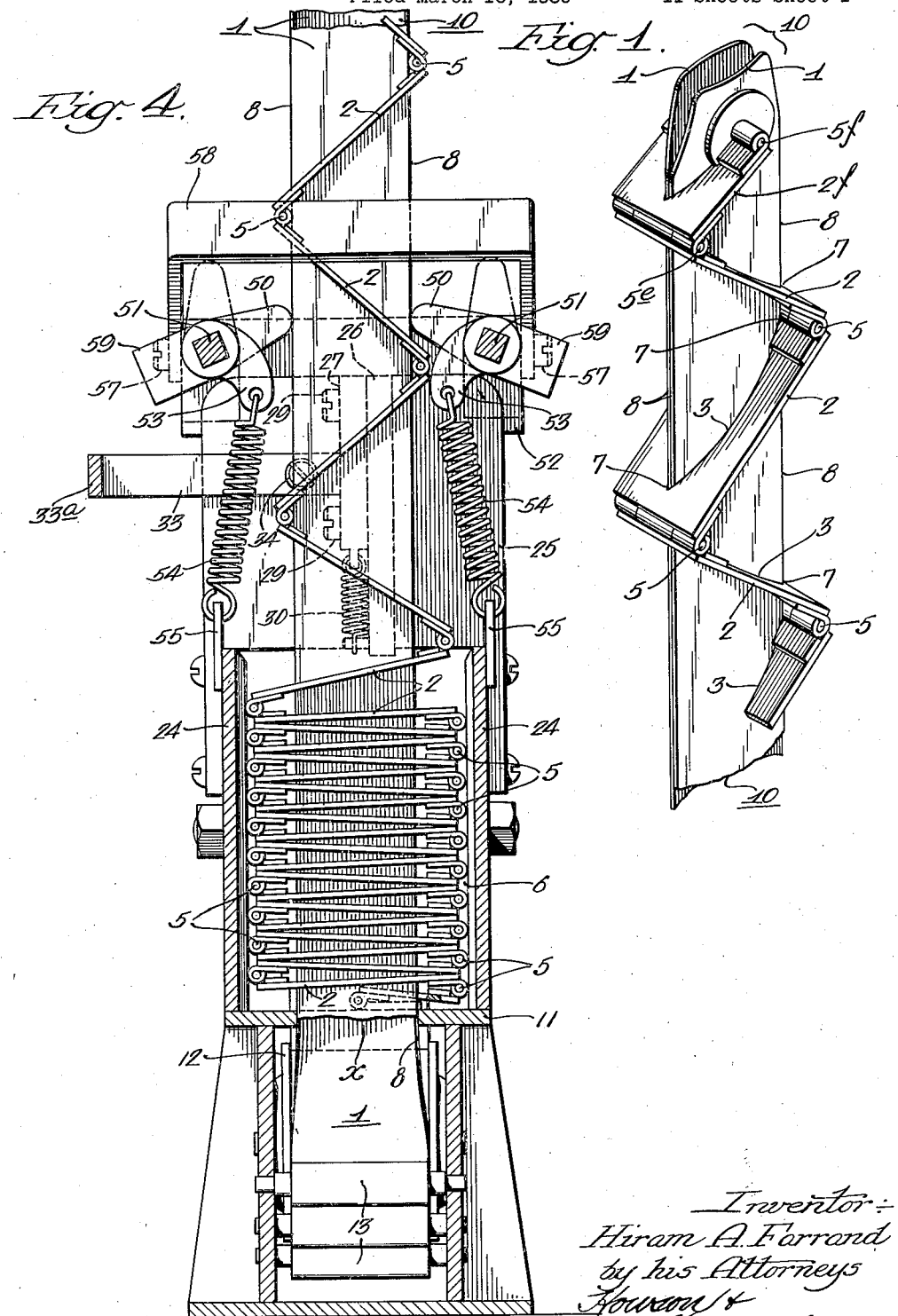
Fig. 1 is a perspective view of a portion of one form of composite structure made and assembled in accordance with the present invention.
Figure 2:
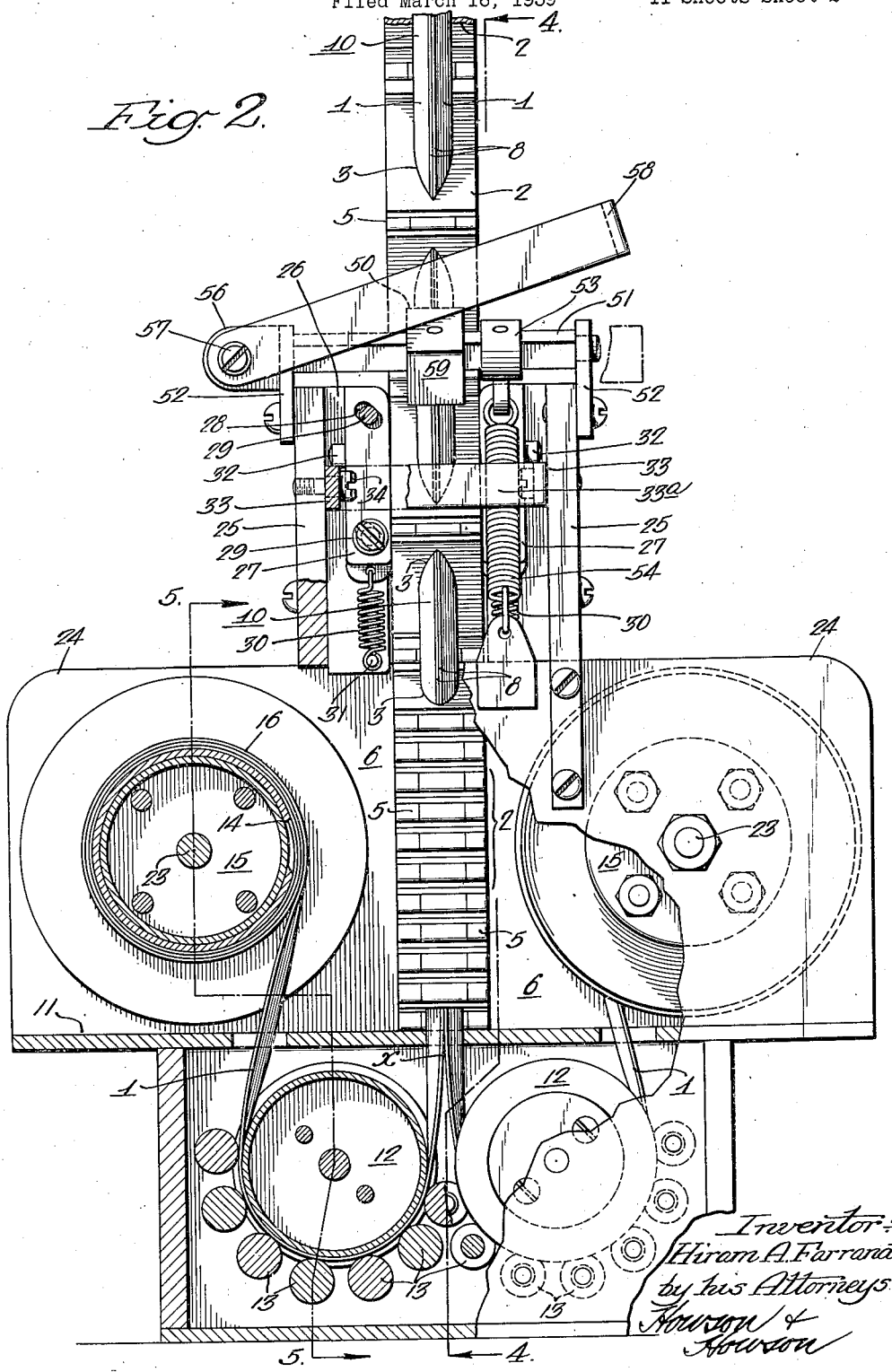
Fig. 2 is a side elevation, partly in section, of a device for assembling and disassembling the component parts of the structure shown in Fig. 1, showing said structure partially extended.

When withdrawn from the columnar combination, the chain links 2a, 2a, fold accordion-wise in the same fashion as the links 2, 2, of the style employed in Figs. 1 and 2. This folding is illustrated in Figs. 8 and 9, at the lower portion of these figures.

In Figs. 6, 7, 8, 8a, 9, 9a and 10 inclusive, an additional system of foldable link-bars 20, 20 is shown. These bars are hinged together by pins 21, 21 and by alternate hinge pins 5b, 5b of alternate link joints of the sprocket-type chain. This additional system of bars, 20, 20 is arranged in the form of toggle arms and of such length that when extended with all joints, or hinges, 5b, 21, 5b, 21, etc. in a straight alignment, the sprocket-like chain is stretched to its full zigzag limit with the hinge-pins 5a, 5a, 5b, 5b, 21, 21 pressing tightly upon the edges 8a, 8a of the strips 1a, 1a lying within its embrace. This is clearly illustrated in the upper portion of the structure shown in Fig. 9–9a and in Fig. 7. When any set of hinge pins as 5b, 21, 5b lie on a straight line the joints of the toggle-bars 20, 20 are said to be on a "dead center"; and, by reason of the resilient back pressure caused by the above described embrace, they may be easily displaced in a lateral direction from that position. To overcome instability arising from this condition, provision has been made, allowing the joints at 21, 21 to move beyond the dead center position in a manner so as to permit the hinge pins 21, 21, to rest against the adjacent 8a, 8a edges of the strips 1a, 1a. To allow for this slight degree "off-center" position the diameters of the pins 21, 21 are of less diameter where they contact the strip-edges than the diameters of the hinge-pins 5b, 5b, immediately above and below. Having assumed this "off-center" position, the back pressure referred to above operates to keep each of the hinge-pins 21, 21, pressing against the edges 8a, 8a of strips 1a, 1a.

In view of the common attachment of the toggle links 20, 20 with the sprocket-like chain system through hinge-pins 5b, 5b, the collapse of the toggle system may proceed in unison with that of the sprocket chain system and open out in unison, therewith. When out of combination the toggle system remains stored alongside the sprocket chain system, and the two systems may be fed out link-set by link-set seriatim, that is, in parallel progression. Obviously, the strips move freely through the openings 3a, in the sprocket-like chain of links in storage, quite as in the case of the links shown in Fig. 4. Thus, due to the employment of the system of toggles, a composite columnar structure capable of self maintenance throughout varying degrees of extension is provided, since each set of toggles insures the stability of the composite structure within the influence of its span. Consequently, the length of the columnar structure may be increased or diminished by adding to or taking away the requisite number of unit-sets, thus described without weakening the adjacent structure.

Figs. 8, 8a, 9, 9a are a mechanism which embodies a structure similar to that shown in Figs. 2, 3, 4 and 5, together with a complement of devices to aid in building up and withdrawing from this composite structure, the several component members used therein. In these figures the spring strips 1a, 1a, are shown leading down below the space 6a employed for the storage of the links 2a, 2a, and into a chamber 22 below the base 11a, where they contact the guide rolls 12a, and, separating at the point x1, pass in opposite ways following curved paths lying between the peripheries of the rollers 12a, 12a, and the series of antifriction rollers 13a, 13a. After following the distance of approximately one half a circle, each strip leaves the guide rollers and passes up to an attachment on the reel 15a, directly above, where it forms into a coil around the reel-drum similar to the coils 16, 16 of Fig. 2.

The reels 15, 15, 15a, 15a, are made to conform to my invention as described in my prior U. S. Patent No. 2,056,844, on Transmission mechanism and in particular that embodiment of the idea as illustrated in Figs. 15 and 16 of that patent. A reel of such nature automatically operates to wind a concavo-convex spring strip into a coil over its drum whenever the strip is pushed forward and into it from a tangential direction. It also allows the strip to unwind automatically from such a coil when not under restraint.

Consequently the reels, 15, 15, 15a, 15a, receive the strips 1, 1, and 1a, 1a and convert them into coils for storage when ever they are thrust toward the reels during the process of reduction in the composite column-length, and they likewise, pay out whatever length of strip is needed to build up further, the composite column length, as required. The reels 15, 15, 15a, 15a, are rotatable on arbors 23, 23, which are mounted between two walls 24, 24.

It will be seen that with a supply of component parts in storage, as shown in Figs. 8 and 9, one may call upon any number of complementary pieces and build up whatever length of columnar structure may be desired within the total available. Also that the length of any such composite column may be reduced to whatever extent may be desired by simply thrusting down on the end of the column with sufficient force to overcome whatever resistance may oppose the action. The several complementary parts making up the deposed portion of the column will pass out of combination and enter their respective storage positions, automatically.

Figs 8, 9 and 10 are side elevation, end elevation and plan, respectively, of a mechanism embodying the composite structure shown in Figs. 6 and 7 together with a complement of means for storing a proper supply of parts composing the columnar structure and for controlling and guiding the several parts during their passage from one position to another in to and out of combination. When the component parts are withdrawn from the combination they move downward in the same fashion as described for the mechanism shown in Figs. 2 and 3, with the diagonal members 2a, 2a, and toggle arms 20, 20 folding compactly, while the strips 1a, 1a pass on through to separate ways and follow circular paths in practically the same manner as previously described.

Up to this point the two styles of structure and mechanism operate in quite similar fashion. But in the matter of control at the point where the several parts enter into the column combination each style employs an individual means—not common to both.

Figure 3:
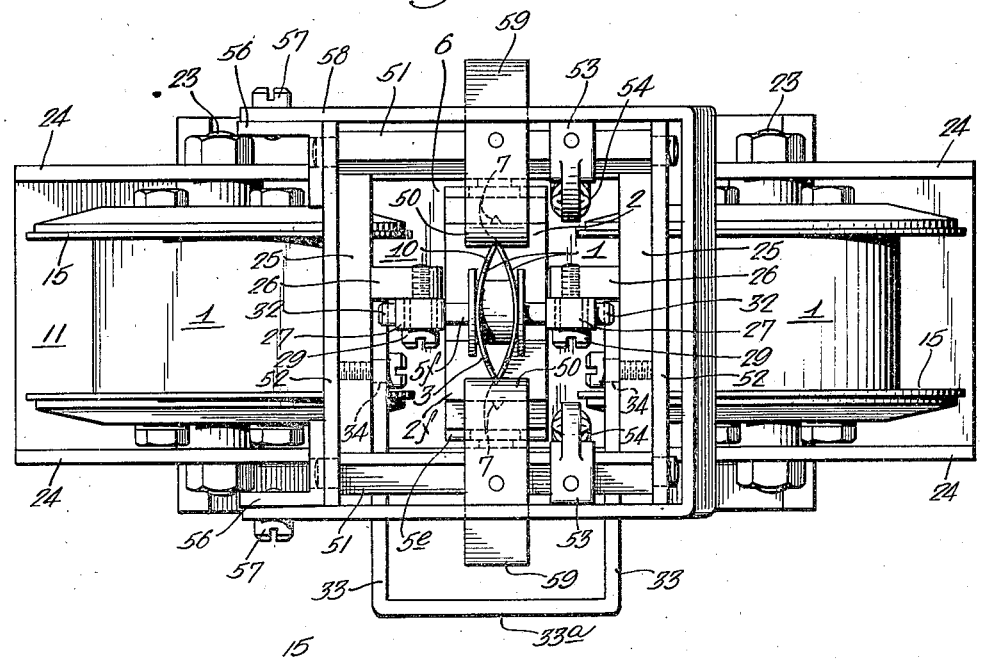
Fig. 3 is a plan view of the structure shown in Fig. 2.
Figure 5:
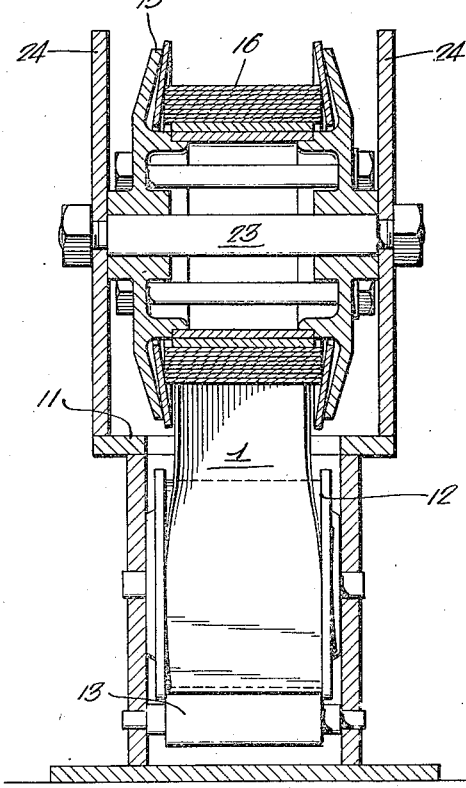
Fig. 5 is a transverse sectional elevation taken on the line 5—5, Fig. 2.

In Figs. 2, 3 and 4, two walls 25, 25 are mounted on top of and extend transversely to the walls 24, 24 between which the reels or drums 15, 15 rotate. Projecting inwardly toward the column from each wall 25, is a bar 26, which supports a brake shoe 27. Located at the top and bottom of shoe 27, is a diagonal slot 28, through which projects supporting pin 29, which is mounted in bar 26. Attached to the lower end of each shoe is a tension spring 30, which in turn is hooked to a hook ear 31, on the bar 26. The tension of these springs is to hold the brake shoes 27 in frictional contact with the sides of the diagonal numbers link elements 2, 2, with the purpose of retarding the opening out of the links, 2, 2, during their movement up into combination and thus insure a close fit of opening 3 of each of the links 2 upon the contour of the tubular strip member 10 while in combination therewith. A lug 32 is on the outer side of shoe 27, and lying underneath the lug 32, is the end of a lever 33, the opposite end of which extends beyond wall 25. This lever 33 is pivoted to plate 25 at 34, in such fashion that pressure downward on the outer end of the lever will act to raise shoe 26 and release the braking contact from the sides of the links 2, 2. This release is provided for use when in reducing the length of the composite column, freedom must be afforded the links to follow down with the strips into the storage chamber.

As the process of insuring the full opening of the diagonal bars 2a, 2a, of structure illustrated in Figs. 6, 7, 8, 8a, 9, 9a, is dependent upon the functioning of the toggle arms 20, 20, a different system is provided for the guidance and control of the parts where they enter in or withdraw from, the column combination.

In Figs. 8, 9 and 10 the uprights 35, 36, 37 and 37 constitute the walls of the storage magazine 6a provided to hold the diagonal bars 2a, 2a and toggle arms 20, 20, when withdrawn from the column combination. These walls arise from, and are mounted upon, the base plate 11a. Also, attached to the base plate 11a are the angle bars 38, 38, upon which are mounted pivots 39, 40, 39 and 40 on which are pivoted guiding arms 41, 42, 41 and 42. These guiding arms are provided at their upper portions with arcuate slots 43, 43, 44 and 44, the arcs of which are centered on the pivots 39, 39, 40 and 40 respectively. Mounted on the upper portion of wall 35, and passing through slots 43, 43, are stud screws 45, 45, which act to guide and retain the guiding arms 41, 41 in their lateral movements. Mounted at the top of wall 36, and at right angles, (horizontally), thereto is a rigid arm 36a. Upon this arm and passing through slots 44, 44, are stud screws 47, 47, which perform a similar function to studs 45, 45.

In Figs. 6 to 10, inclusive, each set, or pair, of toggle arms 20, 20 is provided with a projecting portion 46 adjacent the hinge 21. As will be seen by inspection of Figs. 8, 9 and 10 these projecting portions 46 of the toggle arms 20, 20, when said arms are rising from storage position, will come into contact with inclined underedges 47, 47 of the guiding arms 42, 42, and be forced toward the edges 8a, 8a of the strips 1a, 1a positioned at the center of the assembly, as long as the upward movement of the links 20, 20 continues. In Fig. 9 one of the projections 46 is shown closely approaching to a dead center position. On arriving at the extreme left ends 48, 48 of the guides 42, 42, the hinge pins 21, 21, will have passed the "dead center" position and rest securely in contact with the edges 8a, 8a of the strips 1a, 1a, adjacent thereto.

Furthermore, whenever a reverse movement is in operation, the projections 46, 46, from above will come in contact with the upper inclined edges 49, 49 of the guides 41, 41, and on continuance will be forced to the right beyond the "dead center" until they reach a point where the bowed position of the toggle arms 20, 20 is sufficient to fold of themselves upon further downward movement toward the storage compartment 6a.

Obviously, the composite structures shown in either Figs. 1, 2 and 3, or in Figs. 6, 7, 8, 8a, 9 and 9a, may be extended to any length desired, limited only by the number of link parts and the length of the strips available. Likewise any reduction may be made from any length extended.

Whenever it is found desirable to project and hold any particular length of extension in a manner to resist any force that may be applied tending to alter that length, as would be the case where the column is called upon to sustain a load at its top, some means to overcome the force of gravity is required in order to prevent the column from collapsing vertically.

In Figs. 2, 3, and 4 is shown a clamp device installed for such purpose. In this device, cam levers 50, 50 are mounted upon square shafts 51, 51 which in turn are mounted in bearings in plates 52, 52, at either end. The plates 52, 52 are, in turn attached to the walls 25, 25. Alongside each cam lever and mounted on the same shaft, is a hook lever 53 attached to tension spring 54. The lower end of spring 54 is hooked into an ear 55, attached to wall 24. The object of this spring is to maintain a contact of the cam lever 50, on the edges 8, 8 of the tubular formation of 10 composed of the strips 1, 1. On each end of one of the plates 52, is an angle bar 56, and each such angle bar carries a stud screw 57, which acts as a pivot for the U-shaped lever 58.

As long as the U-shaped lever 58, remains in the raised position shown by the full lines of the drawing, Fig. 2, the points of the cam levers 50, 50, will remain in contact with the edges 8, 8 of the tubular formation 10 of strips 1, 1. These cam levers both lie ordinarily at such angles to the edges of the strips 1, 1, that any reverse movement of the strips in a down direction will be checked as by a pawl. When, however, a down movement is desired, as would be the case in returning some length of the column to storage, the U-shaped lever 58, is thrown down to the position indicated by the broken lines in Fig. 2. In the down movement the side arms of lever 58 come in contact with the outer arms 59, 59 of the cam levers 50, 50, carrying them along and raising the inner ends out of contact with the edges of the strips 1, 1. Raised in this position the cams 50, 50 offer free passage to the strips 1, 1 and to the links 2, 2. Furthermore this position of the cams is self-maintained as long as the U-shaped lever 58, remains down as shown by the broken lines. This leaves the operator free to manipulate the levers 33, 33, to release brakes 27, 27, during the downward travel of the links toward storage, thus preventing them from piling up above the location of the brakes. As a matter of convenience in operation the outer ends of the levers 33, 33 may be connected by a bar 33a to form a U-shaped lever similar to 58.

It is obvious that should it be desirable to counteract any upward thrust of the column or the parts, an arrangement similar to the one above described, but operating in a reverse direction, could be installed without departing from the spirit of my invention.

In the structure illustrated in Figs. 8, 9, 10, 11 and 12, I have provided a latch device to perform the same duty as that performed by the cam levers, above described. This latch mechanism consists of a sliding bolt 60, mounted in and moving through a rectangular opening 61 in the upper portion of wall 35, Fig. 12. This bolt passes through the wall 35, and projects normally, beyond and to the right of a shoe-piece 62 carried by the wall 35, and into the path followed by the hinge-pins 5a, 5a, in their upward travel. The bolt 60 is held in this forward position by the compression spring 63, which lies in a rectangular opening 64 formed within the bolt 60. The left end of this spring is held in place by a bracket 64, attached to wall 35, and the right end is pressed against the right end of the opening in the latch bolt 60. Normally, the bolt 60, is maintained in proper position by the shoulders 65, 65, on its upper and lower edges which come into contact with the outer surface of wall 35. The right end of the latch bolt 60 is vertically inclined in such fashion that each hinge-pin 5a, in passing upward along the inclined face 66 of shoe 62, drives the bolt back to the left until it passes the upper edge of the bolt, whereupon, the bolt springs back beneath the hinge pin and lies in a position to check any backward movement of the pin and associated parts. With the movement of the assembled column structure stopping there the column will be supported in a manner to resist any downward thrust which would result from a load above. Thus the column may be held at different degrees of extension as desired.

Whenever a downward movement of the column is desired the latch bolt 60 may be drawn back manually, and retained in that position by lowering the lever 67, Fig. 11, in a manner to rest behind the upper shoulder on the latch bolt.

Obviously, the right end of the latch bolt 60 may be forked in such a way as to prevent movement of the hinge pin in either direction or the taper may be reversed so as to check only an upward movement of the column; and such changes may be effected without departing from the spirit of my invention.

Above the position of the shoe piece 62, and on the right hand side of the gap occupied by the column, is another shoe 68, Fig. 9. The horizontal distance between these two shoes is just sufficient to accommodate the width of the assembled column. The vertical distance between these shoes is approximately the vertical distance between hinge pins 5a, and 5b, when these are properly assembled in the column. These shoes, operate to prevent any sway of the column whenever the vertical movement of the parts brings them under the influence of the guides 41, 41, 42, 42, and latch bolt 60.

At this point, it is well to draw attention to the advantage which inheres in a mechanism of the kind under consideration in which the strips 1, 1, and 1a, 1a as employed, are normally of a transversely non-planar, or arcuate shape. Such strips have an inherent stiffness which obviously adds considerably to the rigidity of the combined columnar structure; but this rod-like device also, performs an office in the movement of the parts which would be impossible to a limp strip of spring material. For not only do such strips have an inherent tendency to straighten out but in the arrangements shown in the foregoing description and figures, these strips 1, 1, 1a, 1a, are relied upon to convey a compressive endwise thrust from the reels 15, 15, 15a, 15a, to the column, whenever the latter is in process of upbuilding. By reason of both the stiffness and the ability to bend, these non-planar strips furnish power to unwind and convey the thus freed force through a most circuitous path to actuate the inert and stored links by drawing them out of their folded positions and carrying them into combination, automatically. In fact, the use of nonplanar strips of this description simplifies the entire operation and construction of the mechanism.

The composite structure shown in Figs. 13 to 16 inclusive differs, chiefly from those shown in previous figures by the employment of a flexible strip 1b, which unlike the strips 1, 1, and 1a, 1a of the preceding combinations, is one that remains transversely planar at all times throughout the operation, either in combination as a member of the composite structure, or when dissociated therefrom. But the diagonal bracing members 2b, 2b, are like those shown in the type of structure illustrated in Figs. 1 to 5, inclusive. For, in the present arrangement the diagonal bars surround the flexible strip members 1b, 1b. However, the openings 3b, 3b in the present structure are not elliptical but straight sided narrow slots snugly fitting over the planar strips 1b, 1b. Both the strip and the diagonal bar members bear the same relation to one another as do those of the device shown in Figs. 1 to 5, inclusive.

The present structure employs a toggle system similar to that belonging to the structure shown in Figs. 6 to 12 inclusive; but in the present case a double system of toggles is employed, one along each of the opposite edges of the strips. The shape of the present toggle arms 20a, 20b, differs somewhat from those used in the former case, being designed so that when the joint is set just off the dead center the outer edges of the arms 20a, 20b present a straight line which parallels the edge of the strip 1b adjacent thereto. Toggle arm 20a is also of U-shape, and the transverse portion 69 of the U is slotted as indicated at 70 in such fashion as to fit down over the edges of strips 1b, 1b, when the arms are at rest against the edges of the strips 1b. The slot 70 aids in keeping the strips 1b, 1b in line during any compressive strain placed thereon.

As is shown in Figs. 13, 14 and 15, two rollers 71, 71 supported by the housing walls 24b, 24b, are so placed as to bear on the outer edges of toggle arms 20a, 20b, when the latter lie in line parallel to the edges of the strips, 1b, 1b as described above. When in moving out of storage, the toggle arms lie out of line their passage under the rollers 71, 71, forces them to assume the proper position, by pressing the arms down into a straight line parallel to the edges of the strips 1b, 1b.

Between rollers 71, 71, and the storage space 6b holding the folded toggle bars, rotatable disks 72, 72, are located. Lugs 73, 73, are projections on the hinge pins 21b of the toggle joints. During their passage to and from the storage position these lugs are forced to pass over the rims of the disks 72, 72 consequently, in being returned to the storage position these lugs 73, 73, are forced out beyond the dead center position causing the toggle arms to assume a bowed shape as the lugs pass over the rims of the disks. From that shape the toggle arms fold automatically, into compact shape upon further movement of the composite structure toward the storage position.

In the chamber 22b formed below the base plate 11b, two spring actuated reels 15b, 15b, are mounted to rotate on stationary arbors 23b, 23b, the ends of which are seated in the squared holes in the sidewalls 74, 74 of the chamber. Lying within each reel-drum is a coiled spring 75, one end of which is anchored in a slot of the stationary arbor 23b, while the other end of the spring is riveted or otherwise secured to the interior wall of the drum.

Passing through an aperture in base plate 11b, the strips 1b, 1b, are led down the reel drums 15b and are attached to the exterior peripheral walls thereof. With each spring 75, having an initial tension even with the strips fully wound upon the drum, the strips 1b, 1b, remain under tension at all times and are wound up in coils upon the reel-drums, automatically, whenever the composite column structure is pushed toward the storage position. The tension in the present instance, while sufficient to wind up all of the slack in the strips as released from the composite structure, is not great enough to overcome the friction and inertia of the other moving parts and thus cause a retractile movement of the structure as a whole. It will be understood, however, that in case a stronger tension is employed, or absolute locking is desired, retarding or locking devices similar in effect to those employed in connection with the mechanisms shown in Figs. 1, 2, 3 and 4, or Figs. 11 and 12, may be provided.

In passing to and fro the strips 1b, 1b, pass between anti-friction rollers 76, 76, below which point x2 their paths separate to join their individual reels. In view of the non-rigid character of strips 1b, 1b their travel outward must be brought about by a tensile reaction from the point of, or beyond the position of assembly of the parts into the ultimate structural formation. Ordinarily this would be effected by pulling on the extended portion of the structure itself. Hence the entire movement of strips 1b, 1b, is dependent upon tensile force as contrasted to that of strips 1, 1, and 1a, 1a of the previously described devices. Obviously in each of the structures one of the strips 1, 1a or 1b, may be eliminated and the rigidifying structure made to embrace the remaining single strip solely to form a composite column, with the single strip of a thickness corresponding to the combined thicknesses of the plurality of strips, if desired.

Figs. 17 to 21, inclusive, illustrate an improved type of adjustable platform 80 in which the height of the platform is varied by means of changes effected in the length of the supporting column. The supply of component members entering into the column assembly is stored in the casing which surrounds the base forming the pedestal of the column. These members thus stored are drawn from their stores automatically whenever the length of the column is increased.

The members composing the column consists of three flexible spring strips 1d, 1d, 1d, and three chain-like structures made up of transverse tie rods 99, 99, 99, connected by links 2d, 2e, etc. In this form of my invention the term "element" referred to in certain of the appended claims may comprise the rod 99. The spring strips 1d, 1d, 1d, are normally of a transversely planar shape and when stored, remain in that condition, where they are wound upon individual reels 15d, 15d, 15d, these reels lie within a hollow pedestal casing 91. The chain-link members are foldable and when out of use lie stacked in folded condition in individual recesses 92 of the pedestal casing. From their respective stores these several members are drawn upward to the point of assembly to form the column structure, whenever the platform 80 is raised.

The reels 15d, 15d, 15d, are rotatably mounted upon stationary arbors 23d, 23d, 23d, the latter being supported by the casing walls. Within the interior of each winding drum of the reels is a coiled spring 75d, the inner end of which is anchored in a slot of arbor 23d, while the other end of the spring is riveted or otherwise secured to the interior peripheral wall of the reel drum. The lower end of each strip 1d, is fastened to the periphery of the drum of its respective reel. The spring 75d is arranged to provide an initial tension such that it exerts a pull on the strip 1d at all times. Whenever the length of the composite column is shortened the reel takes up all the slack in the strip by winding it into a coil 16d over the drum. In this instance, as in the case of the structure shown in Figs. 13 and 14, supra, the tension, while sufficient to wind up all the slack in the strips as released from the composite structure is not great enough to overcome the friction and inertia of the other moving parts causing a retractile movement of the structure.

The chain components, when stored, repose in folded form within individual recesses 92 formed by the pedestal casing 91, where they are forced during the retrograde movement from the point of column assembly. At the upper portion of the chamber two retarding springs 93, 93 project into the passageway which act as stops to the stack of links forced upward by compression spring 94, acting on plunger 95, which supports the stack of links above. Whenever the movement to increase the length of the column draws upon the store of links, the upper link unfolds by forcing its end by the opposing spring 93.

In moving between storage and the point of assembly each chain is engaged by a sprocket wheel 96, and during any retrograde movement the links are forced back, serially, and fold into the stack as they emerge from the teeth of the sprocket wheel.

When in column assembly the several component members of the structure must be arranged as shown in Figs. 19 and 21, with the edges 8d, 8d of the strips 1d, 1d, 1d, resting securely in the recesses 97, 97, formed by hooked ends 98, 98 of the tie rods 99, 99, 99. As the width of the strips is greater than the distance between these hooked recesses the strip must be forced to assume a transversely non-planar shape. Furthermore, in order to assemble any strip within the recesses of any tie-rod it will be necessary to bend the strip into a degree of curvature beyond that assumed when lying within those recesses, which must be done in order to pass the points of the hooks. After the passage has been made the strip automatically spreads out and seats itself tightly in the hooked recesses, where it lies under strong tension.

It must be remarked that as these three strips 1d, 1d, 1d leave their respective reels 15d, 15d, 15d, they are transversely planar and as they approach one another, in rising, their transverse shape, taken together, forms the figure of an equilateral triangle, in cross-section, which cannot in that shape be included in the triangle formed by the combined tie-rods 99, 99, 99, and therefore, to enter into combination with them, the strips must be sprung sufficiently to pass the hooks 98 of the tie-rods. This is indicated in Fig. 19 and, to produce this effect, the three broad sprocket wheels 96, 96, 96, have been provided with the transversely curved or crowned peripheral faces and adjusted with relation to the center of the column as to force the strips into the curvature such as may pass the points of the hooks 98 on the tie-rods 99. The edges 8d of the strips 1d remain tightly pressed together. The point of extreme pressure is opposite the axes of the sprocket wheels which convey the tie-rods to the same point, so that the assembly is effected at that point in the progress. As the parts pass beyond this point the pressure recedes and the strips spread out and rest in the recesses of the hooked tie rods.

It is obvious that the reverse movement of the parts will effect the separation of the members forming the column and that these members will be deposited in their respective storage places.

The tie rods 99, 99 of each of the chains are connected together to form the chains by links 2d and 2e. The sprockets 96, 96 are circumferentially grooved at 100 and 101 to receive these links and the sprockets are grooved transversely at 102 to receive the tie rods 99.

In each instance the outer free end of the link structure which embraces the strip members 1, 1a, 1b, 1d, is connected to the strip members as clearly indicated in Figs. 1, 6, 9a, 13 and 15a, by short links 2f having pivotal connection with the strip members, as indicated at 5f and with the link elements as at 5e, so that the link members will be drawn out of storage at the same time as the free outer ends of the strip members move outwardly from the assembling devices, and vice versa.

As shown in Fig. 6, for example, the composite structure, when desired, may be completely removed from the assembling and disassembling device for use independent thereof, as a beam, for example. Then by merely reinserting the last assembled end of composite structure into the disassembling device and applying longitudinal thrust thereto the composite structure will be collapsed and dismembered in the storage spaces reserved for the various component parts of the structure.

In each instance, whether the composite structure is only partially extended from the assembling and disassembling device, or completely disconnected therefrom as noted above, the articulated series of strip embracing elements, being inherently rigid when extended into contact with the strips in the composite structure, resist torsional as well as tensile and compressive stresses about the longitudinal axis of the composite structure by reason of the clamping engagement of the embracing elements with the longitudinal edges of the strips, which in structures embodying a plurality of strips prevents relative movement between the abutting longitudinal edges of the strips and thus aids the strips in resisting torsional, tensile, and compressive tendencies.

I claim:

1. A collapsible composite structure comprising a plurality of resilient strips collectively forming the main body of said structure, a series of pivotally connected extraneous elements disposed outside and diagonally crossing from edge to edge of said body and engaging aligned pairs of the longitudinal edges of said strips at relatively spaced points along the length of said body for rigidifying said structure and rigid means extending from one to the next of said relatively spaced points and there connected to said extraneous means to maintain said spacing of said points.

2. A collapsible composite structure comprising a plurality of resilient strips collectively forming the main body of said structure, a series of pivotally connected extraneous elements disposed outside and diagonally crossing from edge to edge of said body and engaging aligned pairs of the longitudinal edges of said strips at relatively spaced points along the length of said body for rigidifying said structure, means for automatically assembling and disassembling the components of said structure upon relative longitudinal movement of said structure from and toward said means, and means bearing against said extraneous elements to effect pivotal movement of said extraneous elements for attaining contact thereof with said strips at said spaced points during concurrent movement of said strips and said extraneous elements outwardly from said assembling means.

3. A collapsible composite structure comprising a plurality of resilient strips collectively forming the main body of said structure, a series of pivotally connected extraneous elements disposed outside and diagonally crossing from edge to edge of said body and engaging aligned pairs of the longitudinal edges of said strips at relatively spaced points along the length of said body for rigidifying said structure, means for automatically assembling and disassembling the components of said structure upon relative longitudinal movement of said structure from and toward said means, means bearing against said extraneous elements to effect pivotal movement of said extraneous elements for attaining contact thereof with said strips at said spaced points during concurrent movement of said strips and said extraneous elements outwardly from said assembling means, and means for releasing said bearing means to allow for disassembling of said structure.

4. A collapsible composite structure comprising a plurality of resilient strips collectively forming the main body of said structure, a series of pivotally connected extraneous elements disposed outside and diagonally crossing from edge to edge of said body and engaging aligned pairs of the longitudinal edges of said strips at relatively spaced points along the length of said body for rigidifying said structure, toggle levers connected to the pivots of said extraneous means at said spaced points and pivotally connected together intermediate said points, means for assembling and disassembling the components of said structure upon longitudinal movement of said structure relative to said assembling and dissambling means, including means for straightening said toggle levers intermediate said points upon outward movement of said structure to prevent longitudinal collapse of said structure.

5. A collapsible composite structure comprising a plurality of resilient strips collectively forming the main body of said structure, a series of pivotally connected extraneous elements disposed outside and diagonally crossing from edge to edge of said body and engaging aligned pairs of the longitudinal edges of said strips at relatively spaced points along the lenth of said body for rigidifying said structure, toggle levers connected to the pivots of said extraneous means at said spaced points and pivotally connected together intermediate said points, means for assembling and disassembling the components of said structure upon longitudinal movement of said structure relative to said assembling and disassembling means, including means for straightening said toggle levers intermediate said points upon outward movement of said structure to prevent longitudinal collapse of said structure, and means for breaking said toggles at said intermediate points to allow disassembling of said structure.

6. A collapsible composite structure comprising a plurality of resilient strips collectively forming the main body of said structure, a series of pivotally connected extraneous elements disposed outside and diagonally crossing from edge to edge of said body and engaging aligned pairs of the longitudinal edges of said strips at relatively spaced points along the length of said body for rigidifying said structure, toggle levers connected to the pivots of said extraneous means at said spaced points and pivotally connected together intermediate said points, means for assembling and disassembling the components of said structure upon longitudinal movement of said structure relative to said assembling and disassembling means, including means for straightening said toggle levers intermediate said points upon outward movement of said structure to prevent longitudinal collapse of said structure, and means engageable with said structure to prevent inward movement thereof with respect to said assembling and disassembling means.

7. A compound structure capable of lengthwise extension and contraction and comprising a main body strip of flexible material, and a rigidifying structure coextensive with said strip and comprising a series of transverse members engageable with the opposite edges of said body strip at spaced intervals longitudinally of said strip, and a chain of successively connected elements pivotally attached to said transverse members and arranged with alternate connections of said chain adapted to lie in a common line longitudinally of said strip, with the intermediate connections movable laterally to one side of said line to lock said elements in rigidifying positions and prevent lengthwise contraction of said structure and to the opposite side of said line to unlock said elements and permit said lengthwise contraction of said structure.

8. A compound structure capable of lengthwise extension and contraction and comprising a main body strip of flexible material, and a rigidifying structure coextensive with said strip and comprising a series of transverse members engageable with the opposite edges of said body strip at spaced intervals longitudinally of said strip, and a chain of successively pivotally connected elements pivotally attached to said transverse members and arranged with alternate connections of said chain adapted to lie in a common line longitudinally of said strip, with the intermediate connections movable laterally to one side of said line into contact with said strip to lock said elements in rigidifying positions and prevent lengthwise contraction of said structure and to the opposite side of said line to unlock said elements and permit said lengthwise contraction of said structure.

9. In a compound supporting structure capable of variable lengthwise extension, component member- systems of differing physical characteristics, said member-systems being jointly associated in a unit body to create said compound supporting structure in proportions varying with the lengthwise extension thereof, with such portions of said member-systems as may not be in association at any time being separable one from another, and different means for storing the dissociated portions according to their physical characteristics, one of said component members consisting of a flexible strip of relatively thin resilient material, and another of said members being composed of a chain of distinct rigid elements connected for free, pivotal, relative movement embracing said flexible strip for aiding resistance to torsional, tensile and compressive stresses with each element engaging the longitudinal edges of said strip independently of the other elements to maintain the structure rigid when said structure is in a partially collapsed or extended condition.

10. In a compound supporting structure capable of lengthwise extension, a plurality of component member-systems coextensive and jointly associated to form a unit body, one of said member-systems consisting of at least one coilable strip of relatively thin resilient material, and another of said member-systems being composed of a foldable chain of rigid distinct elements connected for free, pivotal, relative movement adapted to embrace the first said member system along its length in the assembled composite structure and inherently opposing distortion of said structure relative to the longitudinal axis thereof, each element engaging the longitudinal edges of said strip independently of the other elements to maintain the structure rigid when said structure is in partially collapsed or extended condition.

11. In a compound supporting structure capable of variable lengthwise extension, a plurality of components including a flexible strip member of resilient material capable of alternately assuming a rectilinear or a curvilinear longitudinal formation, said strip member being substantially coextensive with said compound supporting structure and when in combination therewith assuming said rectilinear longitudinal and a normal transverse formation, a stress resisting component comprising a series of distinct rigid elements connected for free, pivotal, relative movement embracing said strip member when in said rectilinear formation, said strip being separable from said stress resisting component when not in said combination and assuming said curvilinear formation while said seress resisting component assumes a folded formation, each element engaging the longitudinal edges of said strip independently of the other elements to maintain the structure rigid when said structure is in partially collapsed or extended condition.

12. A compound supporting structure capable of variable lengthwise extension and comprising a plurality of component members including at least one flexible strip of resilient material forming a web-member substantially coextensive with said structure in a longitudinal direction thereof, and a series of distinct rigid elements connected for free, pivotal, relative movement forming a system of lateral tie and brace members over a common length of said structure, said components comprising in union a reinforced structural supporting body capable of resistance to torsional, tensile and compressive stresses, said web-member and said system of lateral tie and brace members combining in effective amounts varying in proportion to the length of the extended portion of said body and when not so combined being separable one from the other, the relation between the external cross-sectional configuration and dimensions of said strip member and the internal configuration and dimensions of each tie and brace members causing said tie and brace members to assume automatically longitudinal and transverse strip embracing positions over the length of said body during concurrent movements of said components toward the point of assembly of said structure, each element engaging the longitudinal edges of said strip independently of the other elements to maintain the structure rigid when said structure is in partially collapsed or extended condition.

13. A compound supporting structure capable of variable lengthwise extension comprising a plurality of component members including at least one flexible strip of relatively thin resilient material, a stress resisting member embracing said strip and consisting of a series of substantially distinct rigid elements connected for free, pivotal, relative movement, the embrace of said strip by said rigid elements being the sole means of engagement between said component members along a substantial portion of the length of said compound supporting structure, and said embrace being of a readily releasable character in order that varying lengths of both components may be released therefrom, each element engaging the longitudinal edges of said strip independently of the other elements to maintain the structure rigid when said structure is in partially collapsed or extended condition.

14. In a compound supporting structure capable of variable lengthwise extensions, a flexible main body component, a stress resisting component separable from said main body and comprising a continuous extensible and collapsible system of distinct rigid elements connected for free, pivotal, relative movement adapted when extended to embrace said main body with each of the elements engaging the longitudinal edges of said main body independently of the other elements to maintain the structure rigid and for opposing distortion about the longitudinal axis thereof when said structure is in partially collapsed or extended condition.

15. In a compound supporting structure capable of change in lengthwise extension, a flexible strip comprising the main body thereof, and a separable torsion resisting component embracing said main body and reinforcing said body against torsional stresses in any direction about the longitudinal axis of said body, said torsion resisting component consisting of a continuous series of distinct rigid elements connected for free, pivotal, relative movement coextensive with the length of said main body, each element engaging the longitudinal edges of the strip independently of the other elements to maintain the structure rigid when said structure is in partially collapsed or extended condition.

16. A collapsible composite structure comprising a plurality of resilient strips collectively forming the main body of said structure, and a series of distinct elements connected for free, pivotal, relative movement disposed outside said body and engaging aligned pairs of the longitudinal edges of said strips along the length of said body each element engaging said edges independently of the other elements to maintain the structure rigid when said structure is in partially collapsed or extended condition.

17. A collapsible composite structure comprising a plurality of resilient strips collectively forming the main body of said structure, and a series of distinct elements connected for free, pivotal, relative movement disposed outside and crossing from edge to edge of said body and engaging aligned pairs of the longitudinal edges of said strips along the length of said body each element engaging said edges independently of the other elements to maintain the structure rigid when said structure is in partially collapsed or extended condition.

18. A collapsible composite structure comprising a plurality of resilient strips collectively forming the main body of said structure, and a series of distinct elements connected for free, pivotal, relative movement disposed outside and diagonally crossing from edge to edge of said body and engaging aligned pairs of the longitudinal edges of said strips at relatively spaced points along the length of said body each element engaging said edges independently of the other elements to maintain the structure rigid when said structure is in partially collapsed or extended condition.

19. A collapsible composite structure comprising a plurality of resilient strips normally of non-planar cross-section collectively forming the main body of said structure, and a series of distinct rigid elements connected for free, pivotal, relative movement disposed outside said body and engaging aligned pairs of the longitudinal edges of said strips along the length of said body each element engaging said edges independently of the other elements to maintain the structure rigid when said structure is in partially collapsed or extended condition.

20. A collapsible composite structure comprising a plurality of resilient strips normally of non-planar cross-section collectively forming the main body of said structure and arranged with concaved faces of said strips turned inwardly toward the longitudinal axis of said body, and a series of distinct rigid elements connected for free, pivotal, relative movement disposed outside said body and engaging aligned pairs of the longitudinal edges of said strips along the length of said body each element engaging said edges independently of the other elements to maintain the structure rigid when said structure is in partially collapsed or extended condition.

21. A collapsible composite structure comprising a plurality of resilient strips collectively forming the main body of said structure and arranged with convexed faces of said strips turned inwardly toward the longitudinal axis of said body, and a series of distinct rigid elements connected for free, pivotal, relative movement disposed outside said body and engaging aligned pairs of the longitudinal edges of said strips along the length of said body each element engaging said edges independently of the other elements to maintain the structure rigid when said structure is in partially collapsed or extended condition.

22. A collapsible composite structure comprising a plurality of resilient strips normally of non-planar cross-section collectively forming the main body of said structure and arranged with concaved faces of said strips turned inwardly toward the longitudinal axis of said body, and a series of distinct rigid elements connected for free, pivotal, relative movement disposed outside and diagonally crossing from edge to edge of said body and engaging aligned pairs of the longitudinal edges of said strips at relatively spaced points along the length of said body each element engaging said edges independently of the other elements to maintain the structure rigid when said structure is in partially collapsed or extended condition.

23. A collapsible composite structure comprising a plurality of resilient strips collectively forming the main body of said structure, a series of distinct elements connected for free, pivotal, relative movement disposed outside said body and engaging aligned pairs of the longitudinal edges of said strips along the length of said body, each element engaging said edges independently of the other elements to maintain the structure rigid when said structure is in partially collapsed or extended condition, and means for automatically assembling and disassembling the components of said structure upon relative longitudinal movement of said structure from and toward said means.

24. A collapsible composite structure comprising a plurality of resilient strips collectively forming the main body of said structure, a series of distinct elements connected for free, pivotal, relative movement disposed outside said body and engaging aligned pairs of the longitudinal edges of said strips along the length of said body, each element engaging said edges independently of the other elements to maintain the structure rigid when said structure is in partially collapsed or extended condition, means for automatically assembling and disassembling the components of said structure upon relative longitudinal movement of said structure from and toward said means, and storage means for said strips permitting free separate relative movement therebetween during said assembling and disassembling.

25. A collapsible composite structure comprising a plurality of resilient strips collectively forming the main body of said structure, a series of distinct elements connected for free, pivotal, relative movement disposed outside said body and engaging aligned pairs of the longitudinal edges of said strips along the length of said body, each element engaging said edges independently of the other elements to maintain the structure rigid when said structure is in partially collapsed or extended condition, means for automatically assembling and disassembling the components of said structure upon relative longitudinal movement of said structure from and toward said means, storage means for said strips permitting free separate relative movement therebetween during said assembling and disassembling, and means for storing said series of elements independent of said strip storage.

26. A collapsible composite structure comprising a plurality of resilient strips collectively forming the main body of said structure, a series of distinct elements connected for free, pivotal, relative movement disposed outside said body and engaging aligned pairs of the longitudinal edges of said strips along the length of said body, each element engaging said edges independently of the other elements to maintain the structure rigid when said structure is in partially collapsed or extended condition, means for releasing said strips from said series of elements, and means completely separating said released strips in different directions outwardly from the longitudinal axis of said body.

27. A collapsible composite structure comprising a plurality of resilient strips collectively forming the main body of said structure, a series of distinct elements connected for free, pivotal, relative movement disposed outside body body and engaging aligned pairs of the longitudinal edges of said strips along the length of said body, each element engaging said edges independently of the other elements to maintain the structure rigid when said structure is in partially collapsed or extended condition, means for releasing said strips from said series of elements, means completely separating said released strips in different directions outwardly from the longitudinal axis of said body, and means for separately storing each strip and said series of elements.

28. A collapsible composite structure comprising a plurality of resilient strips collectively forming the main body of said structure, a series of distinct elements connected for free, pivotal, relative movement disposed outside said body and engaging aligned pairs of the longitudinal edges of said strips along the length of said body, each element engaging said edges independently of the other elements to maintain the structure rigid when said structure is in partially collapsed or extended condition, means for releasing said strips from said series of elements, means completely separating said released strips in different directions outwardly from the longitudinal axis of said body, means for separately coiling each strip, and means for storing said series of elements.

29. A collapsible composite structure comprising a plurality of resilient strips collectively forming the main body of said structure, a series of distinct elements connected for free, pivotal, relative movement disposed outside said body and engaging aligned pairs of the longitudinal edges of said strips along the length of said body, each element engaging said edges independently of the other elements to maintain the structure rigid when said structure is in partially collapsed or extended condition, means for automatically assembling and disassembling the components of said structure upon relative longitudinal movement of said structure from and toward said means, and means for maintaining said structure in any desired degree of partial extension relative to said assembling and disassembling means.

30. A collapsible composite structure comprising a plurality of resilient strips collectively forming the main body of said structure, a series of distinct elements connected for free, pivotal, relative movement disposed outside and diagonally crossing from edge to edge of said body and engaging aligned pairs of the longitudinal edges of said strips at relatively spaced points along the length of said body, each element engaging said edges independently of the other elements to maintain the structure rigid when said structure is in partially collapsed or extended condition, means for automatically assembling and disassembling the components of said structure upon relative longitudinal movement of said structure from and toward said means, and means bearing against said structure to prevent longitudinal movement thereof toward said assembling and disassembling means.

31. A collapsible composite structure comprising a plurality of resilient strips collectively forming the main body of said structure, a series of distinct elements connected for free, pivotal, relative movement disposed outside and diagonally crossing from edge to edge of said body and engaging aligned pairs of the longitudinal edges of said strips at relatively spaced points along the length of said body, each element engaging said edges independently of the other elements to maintain the structure rigid when said structure is in partially collapsed or extended condition, means for automatically assembling and disassembling the components of said structure upon relative longitudinal movement of said structure from and toward said means, means bearing against said structure to prevent longitudinal movement thereof toward said assembling and disassembling means, and means for releasing said preventing means to permit said movement of said structure.

32. In a compound supporting structure capable of variable lengthwise extension, a plurality of component members including at least one flexible strip of relatively thin resilient material, said strip having straight smooth longitudinal edges adapted to be engaged at relatively spaced points along said edges by a stress resisting component of said structure, said stress resisting component being composed of a foldable chain of distinct rigid strip engaging elements connected for free, pivotal, relative movement, said strip being separable from said chain when the latter assumes a folded position, each element engaging said edges independently of the other elements to maintain the structure rigid when said structure is in partially collapsed or extended condition.

33. A collapsible composite structure comprising a plurality of resilient strips normally of nonplanar cross-section collectively forming the main body of said structure and arranged with the convexed surfaces of said strips turned inwardly toward the longitudinal axis of said body, a series of distinct rigid members engaging alined pairs of the longitudinal edges of said strip at relatively spaced points along the length of said body, and a series of links disposed outside of said body and diagonally crossing from edge to edge of said body, said links having their opposite ends connected to said members for free, pivotal, relative movement, each member engaging said longitudinal edges independently of the other members and said members and links serving to maintain the structure rigid when said structure is in partially collapsed or extended condition.

34. A collapsible composite structure comprising a plurality of resilient strips normally of non-planar cross-section, collectively forming the main body of said structure and arranged with the convexed faces of said strips turned inwardly toward the longitudinal axis of said body, a series of pins arranged transversely of said strips adjacent aligned pairs of the longitudinal edges of said strips and engaging aligned pairs of said longitudinal edges at relatively spaced points along the length of said body, and a series of links disposed outside of said body and diagonally crossing from edge to edge of said body, said links having their opposite ends connected to said pins for free, pivotal, relative movement, and rigid means extending from one to the next of said relatively spaced points and there connected to said pins to maintain said spacing of said points.

HIRAM A. FARRAND.